United States Patent Office 3,706,610
Patented Dec. 19, 1972

3,706,610
COMPOSITE POLYSULFIDE PROPELLANT CURED WITH A MONOFUNCTIONAL MERCAPTAN
Harry R. Ferguson, Morrisville, Pa., assignor to the United States of America as represented by the Secretary of the Army
No Drawing. Filed Nov. 7, 1962, Ser. No. 236,171
Int. Cl. C06d 5/06
U.S. Cl. 149—19         10 Claims

ABSTRACT OF THE DISCLOSURE

Solid composite propellants based on cured polysulfide polymers are improved in elasticity and resistance to mechanical shock by using a monofunctional mercaptan as the curing agent. The curing step is conducted in a mold of the desired shape.

---

This invention relates to solid rocket propellant compositions. More specifically the invention is directed to improved polysulfide-inorganic oxidizer propellant compositions and a method for their preparation.

Solid propellants based on cured polysulfide polymers are well known in the art as evidenced by United States Patent 2,997,376 to Charles E. Bartley. These propellants have been widely employed as rocket fuels, especially in military rockets, since many of the inherent difficulties associated with liquid propellant systems are thus obviated.

Nevertheless, these polysulfide polymers have limitations which are distinct disadvantages, especially for military application. For example, rockets employing the composition of the prior art do not perform satisfactorily at low temperatures, particularly in the range of 0° F. to —10° F. At these low temperatures, the solid propellant loses most, if not all, of its elasticity and thus becomes brittle and subject to fissuring as a result of mechanical shock. The fissures drastically alter the burning characteristics of the propellant grain and thus cause unsatisfactory performance of the rocket engine. This is due in part to the fact that the crack in the propellant grain increases the burning area which results in an increase in the mass flow and the chamber pressure. The chamber walls then become overloaded and often fail. Fissuring in the grain also causes burning to progress unevenly in the propellant.

It has now been determined that the elasticity of the solid polysulfide propellant is greatly improved if prior to curing the ingredients of the composition, a monofunctional mercaptan is added to the composition. Polysulfide propellants thus modified give satisfactory performance at temperatures as low as —50° F.

In view of the foregoing, it is an object of this invention to provide polysulfide-inorganic oxidizer solid propellant compositions which are characterized by a high degree of elasticity and thereby resistant to mechanical shock.

It is a further object of this invention to provide polysulfide-inorganic oxidizer solid propellant compositions which possess the ability to perform satisfactorily at temperatures below —40° F.

A still further object of the invention is to provide a method of preparing improved polysulfide-inorganic oxidizer compositions by incorporating into the composition before curing a small amount of a monofunctional mercaptan.

The manner in which these and other objects may be accomplished will become apparent from the discussion given hereinbelow.

Generally, the compositions of the invention are prepared by curing a mixture of a curing agent for liquid polysulfide polymers, a liquid polysulfide polymer, a monofunctional mercaptan, and an inorganic oxidizer. Since the compositions are to be used as propellants, the curing step will usually be conducted in a mold of desired configuration in order to obtain a solid propellant grain of the particular shape required.

Suitable propellant compositions will consist essentially of a cured mixture of approximately 50% to 85% of weight of an inorganic oxidizer, a monofunctional mercaptan, and a liquid polysulfide. The mercaptan will be used in an amount of 0.2% to 2.0% by weight of the weight of liquid polysulfide polymer employed and the total weight of the mercaptan and liquid polysulfide polymer will constitute about 15% to 50% by weight of the propellant composition.

The percentage for the propellant composition given above will vary slightly since a curing agent must be included in order to convert the liquid mixture to a solid composite propellant. However, the curing agent is employed in very small amounts varying from 0.01% to 5.0% by weight of the total composition. For simplicity, the curing agent may be regarded as an additive to be employed over and above the percentages given above for the oxidizer, mercaptan, and liquid polysulfide polymer. As the curing of polysulfide polymer is well known in the art, the quantity of curing agent to be employed with a specific amount of any polysulfide polymer will be apparent to those skilled in the art.

In addition to the essential components of the propellant composition discussed hereinabove, plasticizers, accelerators, and burning rate modifiers may be incorporated into the compositions. These agents assist in the achievement of particular physical and chemical properties for the composition or assist in the curing of the polysulfide polymer. Plasticizers can comprise up to 20% of weight of the composition whereas accelerators will normally comprise not more than 5% by weight of the composition. If burning rate modifiers are employed, they may be used in an amount up to about 8% by weight of the composition.

Liquid polysulfide polymers are readily available from commercial sources. The liquid polysulfide polymer available from the Thiokol Corporation and known in the art as LP-2, LP-3, LP-32, LP-33, and LP-8 are exemplary of the polysulfides which can be employed in the preparation of the propellant compositions of the invention.

Particularly suitable polysulfides are liquid polysulfides of the type prepared as disulfides from dichlordiethyl formal and 1,2,3-trichlorpropane. The above mentioned LP-2, LP-3, LP-32, LP-33, and LP-8 are illustrative of this preferred type of polysulfide and differ from each other in degree of crosslinking and degree of polymerization. It is to be understood, however, that this listing is not inclusive and that other liquid polysulfides having similar physical and chemical properties can be utilized.

Inorganic oxidizers suitable for the solid propellant compositions include the powdered perchlorates and nitrates as exemplified by potassium perchlorate, ammonium perchlorate, sodium perchlorate, lithium perchlorate, barium nitrate, potassium nitrate, sodium nitrate, and ammonium nitrate. Potassium perchlorate and ammonium perchlorate are preferred.

The curing agents, or vulcanizers as they are sometimes referred to, include hexamethylene tetramine, furfural, para-quinone dioxime, and lead peroxide. Any other conventional curing agent can be employed, however. Para-quinone dioxime is a preferred curing agent.

Examples of burning rate modifiers which accelerate the burning rate and/or stabilize combustion are ferric oxide, copper chromite, ammonium dichromate and milori blue.

Among the plasticizers which can be employed in the preparation of the compositions are furfuryl alcohol, furfural, 1-nitropropane, dinitropropane, dibutoxyethoxyethyl formal, dimethyloxyethoxy - ethyl - azelate, and orthonitrobiphenyl. Useful accelerating agents include steric acid, zinc oxide, zinc chromate, N,N-dimethyl-S-tertiary - butylsulfenyl - dithiocarbamate, diphenylguanidine, malic acid, and salicyclic acid. Again, however, the substitution of any other conventional plasticizer or accelerator for those listed above is completely acceptable.

The components discussed above are the recognized constituents of polysulfide polymer-inorganic oxidizer propellant compositions. The particular aspect of the compositions of the present invention which departs from the prior art is the incorporation of a monofunctional mercaptan into the composition before curing. Any mercaptan having only one mercapto substituent is acceptable provided that it possesses no other reactive substituents which interfere with the curing process. However, for reasons of economy and availability monomercapto-substituted aliphatic and aromatic hydrocarbons will normally be employed. Illustrative of these mercaptan are those of the formula R—SH wherein R is selected from the group consisting of alkyl, phenyl, alkyl substituted phenyl, naphthyl (1- or -2), alkyl substituted naphthyl, and benzyl. Specific mercaptans within their group include s-butyl mercaptan, butyl mercaptan, mercaptoethanol, thionaphthol, xylyl mercaptan, benzyl mercaptan, and phenyl mercaptan. Generally, when R is alkyl, the alkyl radical will contain up to seven carbon atoms (that is, heptylmercaptan) although larger alkyl groups containing more than seven carbon atoms are also useful for the purpose of the invention. The alkyl substituents on the aromatic rings when R is phenyl or naphthyl will normally be lower alkyl groups of up to four carbon atoms such as methyl, ethyl, propyl, butyl, and tertiarybutyl. The amount of mercaptan employed is dependent upon the amount of liquid polysulfide polymer and will be in the range of from 0.2% to 2.0% of the weight of the polymer.

Examples of mixtures which can be cured into solid propellants are given below. These ingredients may be added in any order and mixed in any manner which gives thorough intermingling, poured into suitable molds and allowed to stand at room temperature until curing is completed. One distinct advantage in the polysulfide polymer-inorganic oxidizer composition is their ability to solidify (cure) at room temperature. It is advantageous to include acceleration and to employ mild heat to speed the curing process. For example, standing at room temperature, approximately 14 days are necessary to effect a cure. However, using an accelerator at a temperature of 150° F. will effect a cure in 24 hours.

EXAMPLE I

Propellant T-10

| | Grams |
|---|---|
| Potassium perchlorate | 668.0 |
| Ammonium perchlorate | 300.0 |
| Liquid polysulfide polymer (LP-3) | 409.0 |
| Para-quinone dioxime | 27.2 |
| Diphenylguanidine | 13.6 |
| Mercaptoethanol | 2.04 |

EXAMPLE II

This example is identical to Example I except that 2.04 grams of thionaphthol is substituted for mercaptoethanol.

EXAMPLE III

This example contains the same ingredients as Example I except that 2.04 grams of xylyl mercaptan (mixed isomers) is substituted for mercaptoethanol.

EXAMPLE IV

Propellant T-13

| | Grams |
|---|---|
| Ammonium perchlorate | 950.0 |
| Liquid polysulfide polymer (LP-3) | 425.0 |
| Para-quinone dioxime | 28.3 |
| Diphenylguanidine | 14.2 |
| Xylyl mercaptan (mixed isomers) | 2.13 |

EXAMPLE V

Propellant T-14

| | Grams |
|---|---|
| Ammonium perchlorate | 793.0 |
| Liquid polysulfide polymers (LP-33) | 566.0 |
| Para-quinone dioxime | 37.8 |
| Diphenylguanidine | 18.9 |
| Benzyl mercaptan | 1.12 |

The above examples are merely illustrative of the limitless number of propellant compositions falling within the scope of this invention. Any of the prior art polysulfide compositions can be modified by the addition of the requisite amount of monofunctional mercaptan so as to be included within the scope of the invention.

The final product is a solid rubbery material conforming to the shape of the mold in which it was cured. Normally this propellant material will be inhibited to assist in the effective control of the burning rate. Inhibiting may be accomplished by lining the mold with a mixture of the propellant ingredients minus the oxidizer and allowing the liner to cure as the propellant cures.

It will be apparent to those skilled in the art that mixtures of two or more liquid polysulfide polymers and/or mixtures of two or more oxidizers can be employed in propellant compositions employing monofunctional mercaptans without departing from the invention. These mixtures are mixed and cured in the same manner as set forth herein.

No undue limitation to the scope of the invention is intended by the detailed description presented herein except as reflected in the appended claims.

I claim:

1. A solid propellant composition comprising a cured intimate mixture of (1) about 50% to 85% by weight of an oxidizer selected from the group consisting of ammonium perchlorate, potassium perchlorate, sodium perchlorate, lithium perchlorate, ammonium nitrate, potassium nitrate, sodium nitrate, and barium nitrate; (2) 0.01% to 5% by weight of a curing agent selected from the group consisting of hexamethylene tetramine, furfural, para-quinone dioxime, and lead peroxide; (3) a monofunctional mercaptan of the formula R—SH wherein R is selected from the group consisting of alkyl, phenyl, lower alkyl substituted phenyl, benzyl, naphthyl, and lower alkyl substituted naphthyl; and (4) liquid polysulfide polymer of the type prepared as a disulfide from dichlordiethyl formal and 1,2,3-trichlor-propane; the amount of said mercaptan being from 0.2% to 2.0% of the weight of said liquid polysulfide polymer and the combined weight of said mercaptan and said liquid polysulfide polymer constituting from 15% to 50% by weight of said mixture.

2. A solid propellant composition according to claim 1 wherein an accelerator is present in an amount up to 5% by weight.

3. A composition according to claim 1 wherein a plasticizer is present in an amount up to 20% by weight.

4. A composition according to claim 1 wherein a burning rate modifier is present in an amount up to 8% by weight.

5. A composition according to claim 1 wherein the oxidizer is ammonium perchlorate, the curing agent is para-quinone dioxime, the monofunctional mercaptan is benzyl mercaptan.

6. A composition according to claim 5 where diphenylguanidine is present in an amount of up to 5% by weight; said diphenylguanidine having been employed as an accelerator during the curing process.

7. In the method of preparing solid polysulfide-perchlorate propellant compositions which comprises thoroughly mixing a liquid polysulfide polymer, an inorganic oxidizer, and a curing agent and subsequently curing said mixture to a solid composition the improvement which comprises adding to said mixture prior to curing a monofunctional mercaptan of the formula R—SH wherein R is selected from the group consisting of alkyl, phenyl, lower alkyl substituted phenyl, benzyl, napthyl, and lower alkyl substituted napthyl, the amount of said mercaptan being from 0.2% to 2.0% by weight of the liquid polysulfide polymer employed.

8. The method of preparing solid polysulfide-inorganic oxidizer propellant compositions, said method comprising (a) thoroughly mixing (1) a liquid polysulfide polymer of the type prepared as a disulfide from dichlordiethyl formal and 1,2,3-trichlor-propane; (2) an inorganic oxidizing agent selected from the group consisting of lithium perchlorate, potassium perchlorate, ammonium perchlorate, sodium perchlorate, potassium nitrate, ammonium nitrate, borium nitrate, and sodium nitrate; (3) a curing agent selected from the group consisting of para-quinone dioxime, hexamethylene tetramine, lead peroxide, and furfural; and (4) a monofunctional mercaptan of the formula R—SH wherein R is selected from the group consisting of alkyl, phenyl, lower alkyl substituted phenyl, benzyl, naphthyl, and lower alkyl substituted naphthyl; (b) subjecting said mixture to a temperature of 60° to 250° F. for a period of time sufficient to cure the mixture.

9. The method according to claim 5 wherein the inorganic oxidizer is ammonium perchlorate, the curing agent is para-quinone dioxime, and the monofunctional mercaptan is benzyl mercaptan.

10. The method according to claim 6 wherein the inorganic oxidizer is ammonium perchlorate, the curing agent is para-quinone dioxime, and the monofunctional mercaptan is xylyl mercaptan.

References Cited

UNITED STATES PATENTS

| | | | |
|---|---|---|---|
| 2,997,376 | 8/1961 | Bartley | 149—19 |
| 3,006,743 | 10/1961 | Fox et al. | 149—19 |
| 3,032,449 | 5/1962 | Fox et al. | 149—19 X |

BENJAMIN R. PADGETT, Primary Examiner

U.S. Cl. X.R.

149—20